United States Patent [19]

Moon et al.

[11] Patent Number: 5,732,151

[45] Date of Patent: Mar. 24, 1998

[54] COMPUTERIZED MEMORY MAPPING METHOD FOR TRANSFORMING COLOR DATA

[75] Inventors: Eva-Maria Moon, Washougal, Wash.; Shane D. Wall, Portland, Oreg.; Thomas B. Pritchard, Brush Prairie, Wash.

[73] Assignee: Hewlett-Packard Company, Palo Alto, Calif.

[21] Appl. No.: 891,248

[22] Filed: Jul. 10, 1997

Related U.S. Application Data

[63] Continuation of Ser. No. 397,822, Mar. 3, 1995, abandoned.
[51] Int. Cl.⁶ .................................................. G06K 9/00
[52] U.S. Cl. ........................ 382/167; 382/276; 358/518
[58] Field of Search ........................... 382/167, 162, 382/276; 358/519, 520, 521, 522, 523, 457, 518

[56] References Cited

U.S. PATENT DOCUMENTS

| | | | |
|---|---|---|---|
| 5,031,050 | 7/1991 | Chan | 358/457 |
| 5,457,540 | 10/1995 | Kajita | 358/450 |
| 5,463,471 | 10/1995 | Chou | 358/534 |
| 5,489,998 | 2/1996 | Yamada et al. | 358/518 |
| 5,528,386 | 6/1996 | Rolleston et al. | 358/519 |
| 5,535,020 | 7/1996 | Ulichney | 358/457 |
| 5,539,540 | 7/1996 | Spaulding et al. | 358/501 |
| 5,541,742 | 7/1996 | Imao et al. | 358/518 |

*Primary Examiner*—Yon Couso

[57] ABSTRACT

A method adapted for implementation in a computer system for correcting and half toning color data in a list of colors is provided. Starting with the first color in the list, color corrections are performed. Using traditional half toning methods, descriptions of the resulting printable dots for each position in the halftone matrix for that color are determined. Color corrections and half toning are repeated for each of the colors in the list. A lookup table is compiled. As each pixel of the image from which the list of colors was compiled is encountered, the printable dots are determined by reference to the lookup table.

7 Claims, 3 Drawing Sheets

FIG. 1

| 0 | $R_0\ G_0\ B_0$ |
| 1 | $R_1\ G_1\ B_1$ |
| 2 | $R_2\ G_2\ B_2$ |
| ⋮ | ⋮ |
| 255 | $R_{255}\ G_{255}\ B_{255}$ |

FIG. 2

| 0 | $K_0\ C_0\ M_0\ Y_0$ |
| 1 | $K_1\ C_1\ M_1\ Y_1$ |
| 2 | $K_2\ C_2\ M_2\ Y_2$ |
| ⋮ | ⋮ |
| 255 | $K_{255}\ C_{255}\ M_{255}\ Y_{225}$ |

FIG. 3

| T0 | T1 | T2 | · | · | · | | |
|----|----|----|---|---|---|---|---|
| | | | | | | | |
| | | | | | | | |
| | | | | | | | |
| | | | | | | | |
| | | | | | | | |
| | | | | | | | |
| | | | | | | | T63 |

COMPUTERIZED MEMORY MAPPING METHOD FOR TRANSFORMING COLOR DATA

CROSS REFERENCE TO RELATED APPLICATION

This is a continuation of application Ser. No. 08/397,822 filed on Mar. 3, 1995, now abandoned.

BACKGROUND OF THE INVENTION

1. Field of the Invention

The present invention relates generally to colorimetry, more particularly to color printing, and, more specifically, to a method for storing and displaying color data information.

2. Description of the Related Art

Colorimetry has long been recognized as a complex science. Essentially, as defined in 1931 by the Commission Internationale L'Eclairage (CIE), three primary colors (X, Y, Z) can be combined to define all light sensations we experience with our eyes; that is, the color matching properties of an ideal trichromatic observer defined by specifying three independent functions of wavelength that are identified with the ideal observer's color matching functions form international standards for specifying color.

In general, it has been found possible and convenient to represent color stimuli vectors by a three-dimensional spatial construct, called a tristimulus space or a color space. The fundamentals of color technology are discussed in the literature, such as *Principles of Color Technology*, by Billmeyer and Saltzman, published by John Wiley & Sons, Inc., NY, copyright 1981 (2d. ed.) and *Color Science: Concepts and Methods, Quantitative Data and Formulae*, by Wyszecki and Stiles, published by John Wiley & Sons, Inc., copyright 1982 (2d ed.) in pertinent parts. A variety of such trichromatic model systems—such as the red, green, blue (RGB) model; the cyan, magenta, yellow (and black) (CMY (K)) model; the hue, saturation, value (HSV) model; the hue, lightness, saturation (HLS) model; the luminance, red-yellow scale, green-blue scale (L*a*b*) model; or the YIQ model used in commercial color television broadcasting—provide alternatives for the system designer. See such works as *Fundamentals of Interactive Computer Graphics*, by Foley and Van Dam, Addison-Wesley Publishing Company, incorporated herein by reference in pertinent parts, particularly pages 606–621, describing a variety of tri-variable color models.

Similarly, numerous schemes for transforming data from one color model construct to another (e.g., from RGB to CMYK) are known in the art. Such methods can be simple correlated tables of stored data or more sophisticated methods such as assignee's co-pending patent application Ser. No. 08/375,096, filed on Jan. 18, 1995, by Arlin Jones for a Memory Organization and Method for Multiple Variable Digital Data Transformation. Other methods taught in the textual materials referenced hereinabove can also be used.

Color input and output devices—such a scanners, cathode ray tube (CRT) video monitors, and printers—monitor color in a device-dependent fashion. For example, CRT guns are driven by RGB values (voltage levels or other input signal functions, referred to hereinafter as data triplets) that are stored in a frame buffer. Those RGB values index over the color space of that particular model video monitor; in other words, the color produced by a CRT on a pixel (acronym for "picture element," the smallest part of an electronically coded picture element) of its screen for a given RGB triplet of values is unique to that device. Because of device design dependency, the same RGB triplet may produce a very different color or hue when displayed on a different model CRT and still a different color in a hard copy made with a color printer. Similarly, the use of different ink or toner formulae create device dependencies.

Transforming CRT video monitor RGB triplets into printer RGB (or CMY, or CMYK) values also can be accomplished by utilizing color measurement tools and device-independent color spaces. Device-independent color provides accurate color matching based on an absolute color standard, such as the CIE XYZ model. A device-independent color space provides a way for describing the appearance of a color without referring to the mechanism that produced the color.

Both categories encompass many color spaces, each with unique characteristics. Therefore, each device is provided with a palette of color data, and at least one palette for each mode of operation. Processing data to produce a color document can involve specifying a palette, or palettes, and then using the color data within the current palette to print. In other words, a palette is a collection of colors that are selected by their index numbers. Palettes can be programmable or pre-programmed, read only data bases.

Raster graphics is a commonly used computer graphics coding technique which codes each picture element of the picture area in digital form. Each pixel of a color raster image contains color information. Printing an image pixel by pixel, that is, processing each data triplet consecutively can be prohibitively slow. Raster color processing must convert multiple-bit-per-pixel raster data to an internal representation that can be merged into the destination via some logical operation.

Color lookup tables and halftone rendering algorithms are two types of state variables which are accessed to process input data. One way to define a color raster pixel is by using palette entry indices. Input data can be mapped to new data values via correlated tables. For raster printing, the color of each pixel (the smallest defined picture element) of the medium is specified either as a direct color data point specification or as an index into a stored palette, depending on the pixel encoding mode. Such color lookup tables can re-map colors to compensate for various differences in input data. That is, color lookup tables are transformations that map input color data into a new output color range based upon point-by-point conversions. For example, an underwater photograph produces a severe bluish cast when printed. The user can specify use of a color lookup table that subtracts some color portion from each of the primaries ("neutral balance") before printing to hard copy.

One way to define a color raster pixel is by using palette entry indices. In such indexed graphics selection, colors are chosen using their palette index numbers. In raster graphics, the data bit combination for each pixel forms an index number.

For example, index numbers for an 8-color palette can be specified:

01010101
00110011
00001111, wherein the palette index number equals the three-bit combinations, in this example 01234567 derived by adding the columns of bit designation. The number of colors in a palette dictates the number of bits per pixel of raster data required to specify an index number. For example, to specify 256 colors, you need to send 8 bits of raster data per pixel ($2^8=256$).

Halftone render algorithms determine how colors are rendered using the printers available colors and used to change apparent resolution, change the texture of images, reduce the number of colors, and change a color image to monochrome. Halftoning is a well-known technique; see e.g., *Digital Halftoning* by Robert Ulichney, The MIT Press, Cambridge, copr. 1987.

In addition to transformation between color space models and halftoning, other color correction variables include white/black references, gamma correction (see e.g., Software Developer's Guide, HP DeskJet 500 Series Printers, Edition 1, copr. 1994 by Hewlett-Packard Company, incorporated herein by reference), ink-jet drop depletion techniques (see e.g., U.S. patent application Ser. No. 07/926,264, by Allen et al, filed Aug. 5, 1992, incorporated herein by reference in its entirety), and dithering. For example, to print from an RGB monitor color space to an ink-jet CMYK output, traditional methods receive a description of each pixel as a position on the page and a red, green, and blue data triplet, perform these color corrections as need on that triplet, and then halftone process to create a description of the actual printable dots. Except where the next pixel is identical to that just specified, the entire process is repeated pixel-by-pixel.

Because of the complexity of the color transformation process, there is a need for a more time-efficient method of correcting and halftoning color pixels.

SUMMARY OF THE INVENTION

In its basic aspects, a method for displaying an image from a predetermined color pixel data set for the image generated by a first device with a second device. The method includes the steps of:

receiving the predetermined color pixel data set as a first color space construct data set for the image to be displayed;

correcting the predetermined color pixel data set for device-dependent variables of the second device;

transforming the corrected predetermined color pixel data set from the first color space construct data set into a second device color pixel data set for a second color space construct inherent to the second device;

for each output threshold signal ability of the second device, determining each output signal to be generated for each primary color in each color in the second device color pixel data set;

storing each the output signal second device color pixel data set as a separate matrix of cells of indexed output signal values for each the color in the second device color pixel data set such that each cell of each matrix is indexed to a corresponding single data point of the predetermined color pixel data set; and for each pixel of the image:

selecting the separate matrix of indexed output signals corresponding to a data point of the predetermined color pixel data set for the pixel of the image, determining which output threshold signal is to be generated corresponding to the data point value of the predetermined color pixel data set for the pixel of the image, selecting the cell of the selected matrix based upon the output threshold signal to be generated, sending from the selected cell the indexed output signal value for each the second color space construct stored therein, and displaying a pixel color of the second device color pixel set corresponding to the indexed output signal value.

It is an advantage of the present invention that it provides a more time-efficient method of color correcting and halftoning a given set of color data values.

It is another advantage of the present invention that a stored lookup table for a given set of color data values can be reused.

It is yet another advantage of the present invention that it provides for the storage of color data in a conveniently organized manner that allows for simple and fast data retrieval.

Other objects, features and advantages of the present invention will become apparent upon consideration of the following detailed description and the accompanying drawings, in which like reference designations represent like features throughout the FIGURES.

DESCRIPTION OF THE DRAWINGS

The drawings referred to in this description should be understood as not being drawn to scale except if specifically noted.

DETAILED DESCRIPTION OF THE INVENTION

Reference is made now in detail to a specific embodiment of the present invention, which illustrates the best mode presently contemplated by the inventor(s) for practicing the invention. Alternative embodiments are also briefly described as applicable.

Figure 1:
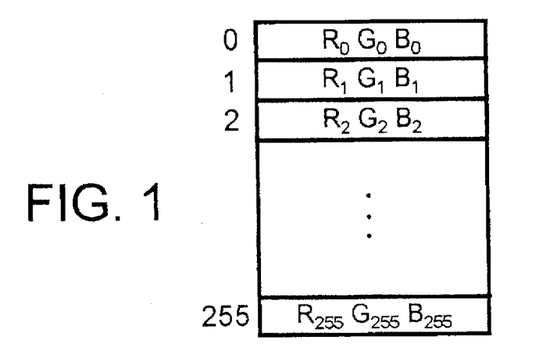
FIG. 1 is schematic depiction of an RGB data origin palette created in accordance with the present invention.

For any image, business graphic, or the like, for example a digitized photograph on a RGB video monitor, a list of colors used in the image is limited and can be compiled. Let this compilation a predetermined color pixel data set be referred to as the origin palette. Thus, the origin palette may be a palette of 256 colors, defined by the RGB values which are compiled and indexed as shown in FIG. 1, a tristimulus color space (also referred to as hereinafter as a "color space construct data set"). In the initialization of the process of the present invention, it may be useful to have a known default palette. Referring to page 1 of Appendix A filed herewith, a source code listing for a software implementation of the present invention, such a default palette is selected. The step of creating an origin palette for an image origin device, the methodology is covered in page 2 of 6 of Appendix A.

[It will be recognized by a person skilled in the art that the order of certain steps of a methodology can be interchanged chronologically; the ordering of the "steps" here is for purpose of description only and is not intended as a limitation on the scope of the invention.]

Indexing into the origin palette requires an 8-bit index value. The RGB values are, for example, 24-bit values: 8-bits for the intensity of each of the three primary color components.

Figure 6:
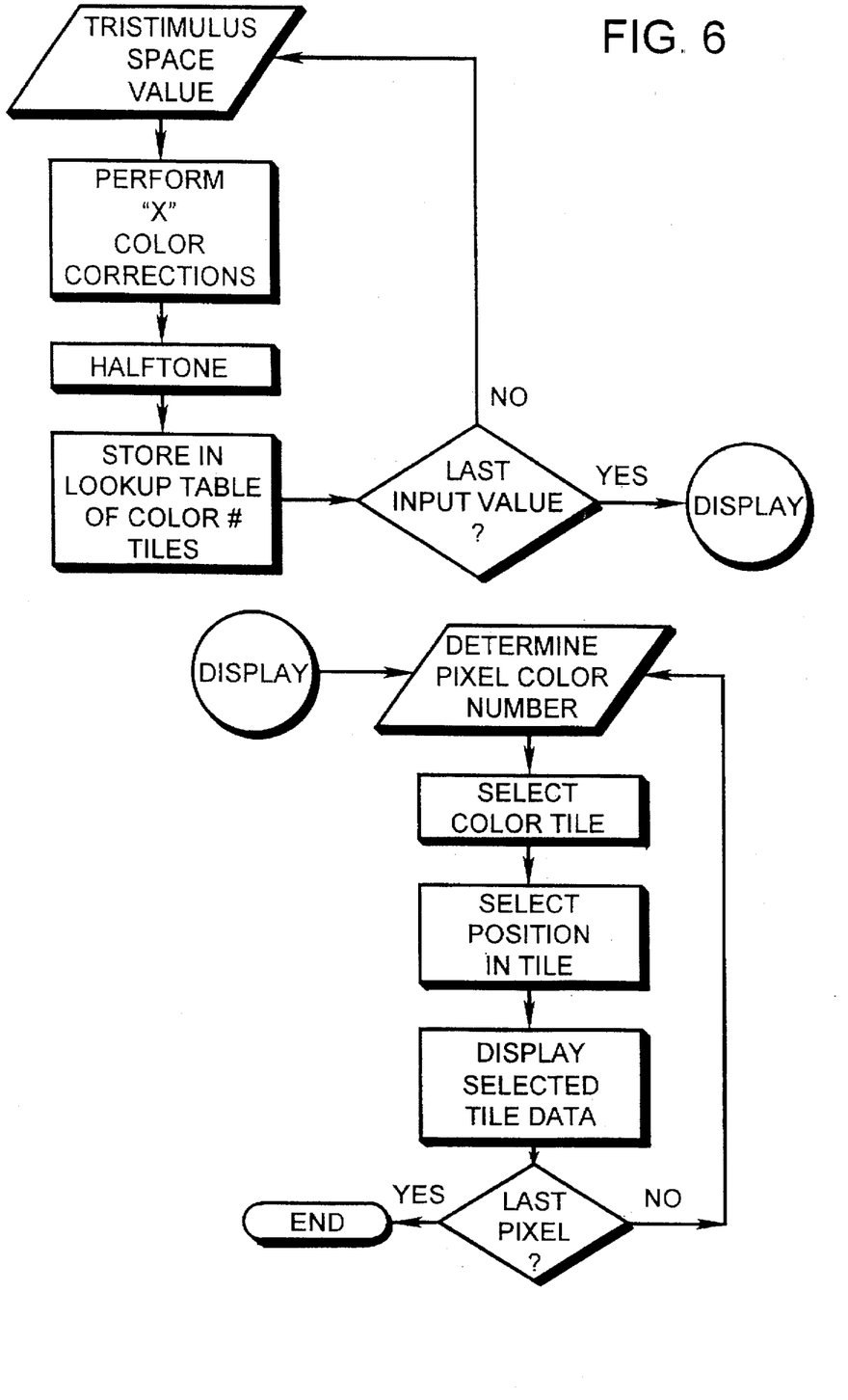
FIG. 6 is a flow chart for the methodology as described and as shown in code format in the Appendix filed herewith.

In the second step, color corrections—such as gamma correction, gray balancing, depletion, and the like—for each origin palette entry is performed. This step of the methodology is covered in page 3 of 6 of the source code filed herewith as Appendix A. A flow chart associated with the source code of Appendix A is shown in FIG. 6.

Figure 2:
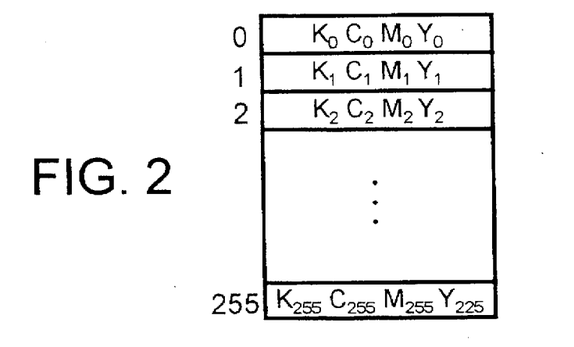
FIG. 2 is a schematic depiction of a transform palette for a CMYK color space construct derived from the present invention as shown in FIG. 1.

The third step of the methodology is to transform the RGB values from the color space of the input device, in this example, an RGB video monitor, to the color space of the output device, in this example, a printer CMYK color space (also referred to hereinafter as an "output (or "second") color space construct" (or construct data set)). These derived CMYK values now require 32-bits, 8-bits for the intensity of each of the four primary components. A color corrected palette is thus created as represented by FIG. 2. This step of the methodology is covered in page 3 of 6 of the source code filed herewith as Appendix A.

The operation thus takes place one value of the origin palette at a time. For example, the first index $R_0G_0B_0$ is color corrected, translated to $K_0C_0M_0Y_0$, and stored in a corrected palette location. The process is repeated for $R_1G_1B_1$, and so on through $R_{255}G_{255}B_{255}$.

It will be recognized that an output device will generally use a device-dependent driver, that is, a software or firmware providing device-dependent variables specific to the particular machine, to provide the image. For example, in ink-jet printing it is known to use a dither matrix which provides a number of threshold values that determine the actual drops of ink to be fired to achieve that color at the target multi-pixel region on the hard copy media.

[The art of ink-jet technology is relatively well developed. Commercial products such as computer printers, graphics plotters, and facsimile machines employ ink-jet technology for producing hard copy. The basics of this technology are disclosed, for example, in various articles in the *Hewlett-Packard Journal*, Vol. 36, No. 5 (May 1985), Vol. 39, No. 4 (August 1988), Vol. 39, No. 5 (October 1988), Vol. 43, No. 4 (August 1992), Vol. 43, No. 6 (December 1992) and Vol. 45, No. 1 (February 1994) editions, incorporated herein by reference.]

Figure 3:
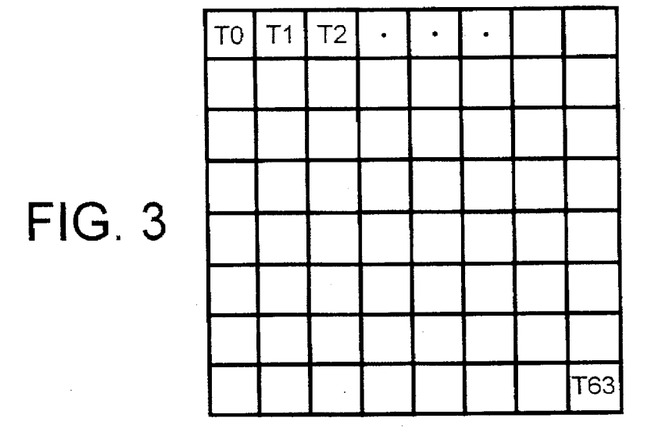
FIG. 3 is a schematic depiction of a dither matrix used in conjunction with the palettes as shown in FIGS. 1 and 2.

For purposes of this example, assume a dither matrix with 64 threshold values is provided as shown in FIG. 3, depicted as T0 through T63.

In the fourth step, for each corrected and translated color, $K_0C_0M_0Y_0$ through $K_{255}C_{255}M_{255}Y_{255}$, and for each position in the dither matrix, it is determined which actual drops of ink are to be fired to achieve the target pixel color on the output media.

In other words, each primary of a corrected color$_{0-255}$ is compared to the threshold value in each threshold value cell, T0–T63, to determine the actual output needed for each cell position (also referred to hereinafter as an "output threshold signal"). Essentially, the cells are based on the position of a pixel on the page to be printed.

[Halftoning is well known in the art; for example, see *Color Gamut Mapping and the Printing of Digital Color Images* by Stone, Cowan, and Beatty, published in ACM Transactions on Graphics, Vol.7, No.4, October 1988, pages 249–292, incorporated herein by reference in its entirety.]

Figure 4:
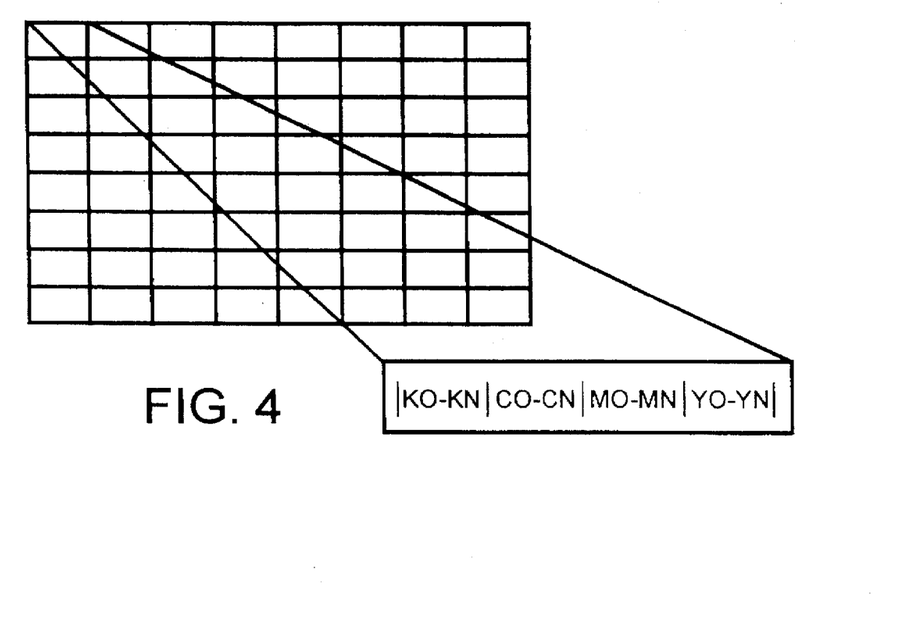
FIG. 4 is a schematic depiction of a color tile derived from the color data as shown in FIGS. 1, 2, and 3.

Each of the 64 results for each color is stored in a new matrix, referred to herein after as a color tile, in a known order, for example, an order substantially identical to the dither matrix. An 8×8 matrix color tile is shown in FIG. 4. Note that the resulting definitions of actual drops of ink to fire for each cell may be comprised of any number of bits. Each of these derived correlations between the corrected and translated colors and the dither matrix requirements to produce each are stored in a manner that will allow for fast retrieval during raster graphics processing. This step of the methodology, creating one color tile for one color from the origin palette, is set forth in pages 4 and 5 of Appendix A.

Figure 5:
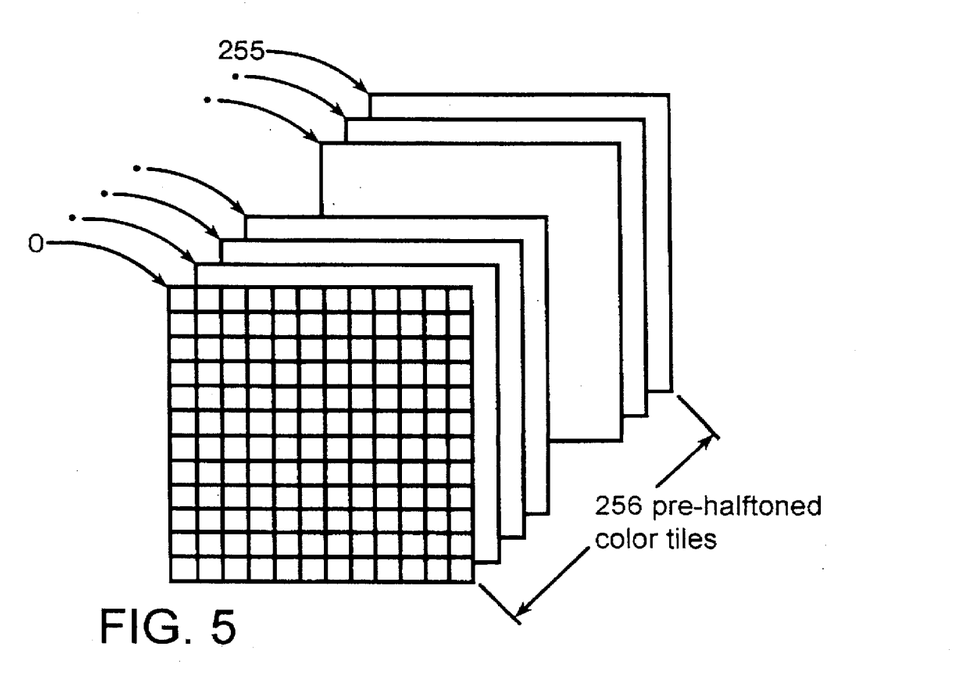
FIG. 5 is a schematic depiction of a index palette lookup table in accordance with the present invention.

The repetition of this for all corrected and translated colors, $KCMY_{0-255}$, creates a set of color tiles as shown in FIG. 5, one color tile for each color in the origin palette. Each cell of a color tile has a color corrected, transformed and halftoned value for each of the original colors. This step of the methodology is covered in page 6 of 6 of the source code filed herewith as Appendix A.

This created set of color tiles is referred to hereinafter as an indexed palette lookup table. In other words, the indexed palette lookup table is a collection of color tiles that are associated with the origin palette. If the indexed palette lookup table is current and complete, that is, the lookup table has been built according to the current values in the origin palette and to the currently selected color corrections and halftoning methods, the origin palette has a location that has a pointer to a color tile for each of those color indices.

Processing of the image to be printed is now performed using the color tiles built in the prior steps of the methodology. The color of each pixel on the page is defined by an RGB value in an index into the origin palette. In that index into the origin palette also exists a corrected, translated value and a pointer to the color tile associated with that color. Then, in a halftoning process, within this color tile, the cell is located which contains the output information for printing this pixel. That is, a pixel will land in one of the cells of the selected color tile 8×8 matrix (FIG. 4). That cell will determine the combination of drops to fire through the exemplary bits shown as:

$$[K_0-K_N|C_0-C_N|M_0-M_N|Y_0-Y_N],$$

where N=number of bits.

The identified dither matrix cell points to the cell in the selected color tile from which the final output bits are retrieved for the pen driver processor and the signal is transferred to that driver.

Thus, the present invention provides that where a limited number of colors for pixels are required, color corrections and halftoning can be performed on those colors once, stored in a lookup table, and retrieved over and over again. It has been determined that this method of transforming a limited set of signals representative of color in an image comprising source pixels into derived color tiles to use as a lookup table can operate approximately three times as fast as traditional data interpolation (e.g., trilinear).

The foregoing description of the preferred embodiment of the present invention has been presented for purposes of illustration and description. It is not intended to be exhaustive or to limit the invention to the precise form disclosed. For example, it will be recognized by a person skilled in the art that the method can be applied to complete images or partial images (e.g., half page calculation versus full page calculation) and that different size tables can be created, 256, 512, 1024, etc. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application to thereby enable others skilled in the art to understand the invention for various embodiments and with various modifications as are suited to the particular use contemplated. It is intended that the scope of the invention be defined by the claims appended hereto and their equivalents.

APPENDIX A
1 OF 6

```
VOID
InitIndexedPalette(BYTE *defaultPalette, BYTE paletteSize)
{
  UINT16
    loopj;

/* free any old color tiles */
  FreePaletteLUT();

for (loopj = 0; loopj < paletteSize; loopj++)
  {
    originPalette[loopj].colorValue.rOrCValue = *(defaultPalette+(3*loopj));
    originPalette[loopj].colorValue.gOrMValue = *(defaultPalette+(3*loopj)+1);
    originPalette[loopj].colorValue.bOrYValue = *(defaultPalette+(3*loopj)+2);

originPalette[loopj].colorValue.kValue = 0;

originPalette[loopj].correctedColor.rOrCValue = 0;
    originPalette[loopj].correctedColor.gOrMValue = 0;
    originPalette[loopj].correctedColor.bOrYValue = 0;
    originPalette[loopj].correctedColor.kValue = MAX_COLOR_INTENSITY;

originPalette[(loopi*paletteSize)+loopj].colorTilePtr = NULL;
  }
}
```

APPENDIX A
2 OF 6

```
VOID
EnterPaletteItem(BYTE index, BYTE newRValue, BYTE newGValue, BYTE newBValue)
{
  ORIGIN_PALETTE_ENTRY
    *paletteEntryPtr;

paletteEntryPtr = &(originPalette[index]);

if (paletteEntryPtr -> colorTilePtr)
    paletteEntryPtr -> colorTilePtr = NULL;

paletteEntryPtr -> correctedColor.rOrCValue = 0;
  paletteEntryPtr -> correctedColor.gOrMValue = 0;
  paletteEntryPtr -> correctedColor.bOrYValue = 0;
  paletteEntryPtr -> correctedColor.kValue = MAX_COLOR_INTENSITY;

paletteEntryPtr -> colorValue.rOrCValue = newRValue;
  paletteEntryPtr -> colorValue.gOrMValue = newGValue;
  paletteEntryPtr -> colorValue.bOrYValue = newBValue;
  paletteEntryPtr -> colorValue.kValue = 0;
}
```

APPENDIX A
3 OF 6

```
VOID
CorrectColor(COLOR_VALUE *srcColorValue, COLOR_VALUE *destColorValue)
{
  extern MAN_IND_PAL_STATE manIndPalState;

UINT16 cValue,mValue,yValue,kValue1,kValue2,totalInk;

cValue = (UINT16)((BYTE)(~(srcColorValue -> rOrCValue)));
  mValue = (UINT16)((BYTE)(~(srcColorValue -> gOrMValue)));
  yValue = (UINT16)((BYTE)(~(srcColorValue -> bOrYValue)));

kValue1 = MIN(MIN(cValue, mValue), yValue);

if (manIndPalState.colorCorrTable.correctColor)
  {
    kValue1 = (UINT16)(*(manIndPalState.colorCorrTable.kHTLinTablePtr+kValue1));
    cValue = (UINT16)(*(manIndPalState.colorCorrTable.cmyHTLinTablePtr+cValue));
    mValue = (UINT16)(*(manIndPalState.colorCorrTable.cmyHTLinTablePtr+mValue));
    yValue = (UINT16)(*(manIndPalState.colorCorrTable.cmyHTLinTablePtr+yValue));

kValue2 = MIN(MIN(cValue, mValue), yValue);
    cValue = cValue - kValue2;
    mValue = mValue - kValue2;
    yValue = yValue - kValue2;

totalInk = kValue1 + cValue + mValue + yValue;

if (manIndPalState.colorCorrTable.deplete &&
        (totalInk > (UINT16)MAX_INK_SATURATION))
    {
      kValue1 = (UINT16)((UINT32)(kValue1 * MAX_INK_SATURATION) /
                         (UINT32)totalInk);
      cValue = (UINT16)((UINT32)(cValue * MAX_INK_SATURATION) /
                        (UINT32)totalInk);
      mValue = (UINT16)((UINT32)(mValue * MAX_INK_SATURATION) /
                        (UINT32)totalInk);
      yValue = (UINT16)((UINT32)(yValue * MAX_INK_SATURATION) /
                        (UINT32)totalInk);
    } if (kValue1 > MAX_COLOR_INTENSITY)
      kValue1 = MAX_COLOR_INTENSITY;
    if (cValue > MAX_COLOR_INTENSITY)
      cValue = MAX_COLOR_INTENSITY;
    if (mValue > MAX_COLOR_INTENSITY)
      mValue = MAX_COLOR_INTENSITY;
    if (yValue > MAX_COLOR_INTENSITY)
      yValue = MAX_COLOR_INTENSITY;
  }
  else
  {
    cValue -= kValue1;
    mValue -= kValue1;
    yValue -= kValue1;
  } destColorValue -> kValue = (BYTE)kValue1;
  destColorValue -> rOrCValue = (BYTE)cValue;
  destColorValue -> gOrMValue = (BYTE)mValue;
  destColorValue -> bOrYValue = (BYTE)yValue;
  /* ...where destColorValue is correctedColor field of origin palette */
}
```

APPENDIX A
4 OF 6

```c
COLOR_TILE_PTR
CreateHalftonedTile(COLOR_VALUE *colorValue)
{
  extern MAN_IND_PAL_STATE manIndPalState;
  extern DTHR_MTX_INFO dthrMtxInfo;

extern MRG_CPX_GFX_STATE mrgCpxGfxState;

BYTE
    xMatrixRef,
    yMatrixRef,
    mAndYXMatrixRef,
    mAndYYMatrixRef;

COLOR_TILE_PTR
    colorTile;

BYTE
    *dots;

colorTile = (COLOR_TILE_PTR)PR_ALLOC(sizeof(COLOR_TILE));

if (colorTile)
  {
    dots = colorTile -> dots;

for (yMatrixRef = 0; yMatrixRef < COLOR_TILE_LENGTH; yMatrixRef++)
    {
      for (xMatrixRef = 0; xMatrixRef < COLOR_TILE_WIDTH; xMatrixRef++)
      {
        *dots = 0;

if ((BYTE)(*(manIndPalState.internalHifipeTable.kLvl4Intensity +
                  (colorValue -> rOrCValue))) > (BYTE)
         (*(dthrMtxInfo.dthrMtxPtr + (yMatrixRef << 3) + xMatrixRef)))
          *dots |= K1_BIT | K0_BIT;
        else if ((BYTE)(*(manIndPalState.internalHifipeTable.kLvl3Intensity +
                  (colorValue -> rOrCValue))) > (BYTE)
               (*(dthrMtxInfo.dthrMtxPtr + (yMatrixRef << 3) +
                 xMatrixRef)))
          *dots |= K1_BIT;
        else if ((BYTE)(*(manIndPalState.internalHifipeTable.kLvl2Intensity +
                  (colorValue -> rOrCValue))) > (BYTE)
               (*(dthrMtxInfo.dthrMtxPtr + (yMatrixRef << 3) +
                 xMatrixRef)))
          *dots |= K0_BIT;

if ((BYTE)(*(manIndPalState.internalHifipeTable.cmyLvl4Intensity +
                  (colorValue -> rOrCValue))) > (BYTE)
         (*(dthrMtxInfo.dthrMtxPtr + (yMatrixRef << 3) + xMatrixRef)))
          *dots |= C1_BIT | C0_BIT;
        else if ((BYTE)(*(manIndPalState.internalHifipeTable.cmyLvl3Intensity +
                  (colorValue -> rOrCValue))) > (BYTE)
               (*(dthrMtxInfo.dthrMtxPtr + (yMatrixRef << 3) +
                 xMatrixRef)))
          *dots |= C1_BIT;
        else if ((BYTE)(*(manIndPalState.internalHifipeTable.cmyLvl2Intensity +
                  (colorValue -> rOrCValue))) > (BYTE)
               (*(dthrMtxInfo.dthrMtxPtr + (yMatrixRef << 3) +
                 xMatrixRef)))
          *dots |= C0_BIT;

mAndYXMatrixRef = (xMatrixRef + 4) & 0x07;
        mAndYYMatrixRef = (yMatrixRef + 4) & 0x07;
```

APPENDIX A
5 OF 6

```
                    (colorValue -> gOrMValue))) > (BYTE)
          (*(dthrMtxInfo.dthrMtxPtr + (mAndYYMatrixRef << 3) +
              mAndYXMatrixRef)))
      *dots |= M1_BIT | M0_BIT;
      else if ((BYTE)(*(manIndPalState.internalHifipeTable.cmyLvl3Intensity +
                    (colorValue -> gOrMValue))) > (BYTE)
          (*(dthrMtxInfo.dthrMtxPtr + (mAndYYMatrixRef << 3) +
              mAndYXMatrixRef)))
      *dots |= M1_BIT;
      else if ((BYTE)(*(manIndPalState.internalHifipeTable.cmyLvl2Intensity +
                    (colorValue -> gOrMValue))) > (BYTE)
          (*(dthrMtxInfo.dthrMtxPtr + (mAndYYMatrixRef << 3) +
              mAndYXMatrixRef)))
      *dots |= M0_BIT;

if ((BYTE)(*(manIndPalState.internalHifipeTable.cmyLvl4Intensity +
                    (colorValue -> bOrYValue))) > (BYTE)
          (*(dthrMtxInfo.dthrMtxPtr + (mAndYYMatrixRef << 3) +
              mAndYXMatrixRef)))
      *dots |= Y1_BIT | Y0_BIT;
      else if ((BYTE)(*(manIndPalState.internalHifipeTable.cmyLvl3Intensity +
                    (colorValue -> bOrYValue))) > (BYTE)
          (*(dthrMtxInfo.dthrMtxPtr + (mAndYYMatrixRef << 3) +
              mAndYXMatrixRef)))
      *dots |= Y1_BIT;
      else if ((BYTE)(*(manIndPalState.internalHifipeTable.cmyLvl2Intensity +
                    (colorValue -> bOrYValue))) > (BYTE)
          (*(dthrMtxInfo.dthrMtxPtr + (mAndYYMatrixRef << 3) +
              mAndYXMatrixRef)))
      *dots |= Y0_BIT;

/* work on next pixel */
      dots++;
    }
  }
}
return(colorTile);
}
```

APPENDIX A
6 OF 6
08 397822

```
COLOR_TILE_PTR
BuildTile(COLOR_VALUE colorValue)
{
    return(CreateHalftonedTile(&colorValue, putHere));
}

VOID
BuildIndexedPaletteLUT()
{
    ORIGIN_PALETTE_ENTRY
        *paletteEntryPtr;

INT16
        loopi;

paletteEntryPtr = originPalette;

for (loopi = 0; loopi <= LAST_PALETTE_ENTRY; loopi++)
    {
        if (!paletteEntryPtr -> colorTilePtr)
        {
            CorrectColor(&(paletteEntryPtr -> colorValue),
                         &(paletteEntryPtr -> correctedColor));

paletteEntryPtr -> colorTilePtr =
                BuildTile(paletteEntryPtr -> correctedColor);

/* next origin palette entry */
        paletteEntryPtr++;
        }
    }
}
```

What is claimed is:

1. A computerized memory mapping method for transforming color data representative of an image from a predetermined color pixel data set for said image generated by a first device and for displaying the image with a second device using transformed color data, said second device having a range of output threshold signal abilities, comprising the steps of:

receiving said predetermined color pixel data set as a first color space construct data set for said image to be displayed;

correcting said predetermined color pixel data set for device-dependent variables;

transforming corrected predetermined color pixel data set from said first color space construct data set into a second device color pixel data set for a second color space construct inherent to said second device;

for each output threshold signal ability of said second device and the predetermined color pixel data set for said image by said first device, determining each output signal to be generated for each primary color in each said color in said second device color pixel data set;

storing each said output signal second device color pixel data set as a separate matrix of cells of indexed output signal values for each said color in said second device color pixel data set such that each cell of each matrix is indexed to a corresponding single data point of said predetermined color pixel data set; and for each pixel of said image, selecting the separate matrix of indexed output signals corresponding to a data point of said predetermined color pixel data set for said pixel of said image, determining which output threshold signal is to be generated corresponding to the data point value of said predetermined color pixel data set for said pixel of said image, selecting the cell of the selected matrix based upon said output threshold signal to be generated, sending from said selected cell the indexed output signal value for each said second color space construct stored therein, and displaying a pixel color of said second device color pixel set corresponding to said indexed output signal value.

2. The method as set forth in claim 1, following said step of correcting said predetermined set of pixel data for device-dependent variables of said second device, comprising the further steps of:

determining whether the color space construct of said second device is different from said color space construct of said first device; and skipping said step of transforming said color pixel data from said first color space construct into a second device color space construct when said first color space construct and said second color construct are not different.

3. The method as set forth in claim 1, where said second device color pixel data set comprises:

data point values for cyan, magenta, yellow primary colors are used for a color printing device.

4. A computer memory device instruction set implementing a method for printing a color hard copy of an image, defined as a predetermined set of data points of pixel data generated by a first apparatus that processes color data using a first color space construct, using a second apparatus that processes color data using a second color space construct and a dithering matrix having a predetermined number of cells with each cell containing a threshold value to provide a threshold pattern for an entire image in the dither method of image printing and having predetermined device dependent color correction variables correlated to said first color space construct and said second color space construct, said method comprising the steps of:

correcting each said primary color data point in said first table in accordance with each of said color correction variables to create a table of corrected primary color data points;

determining if said first color space construct and said second color space construct are identical, and if identical, continuing said method by selecting and using said table of corrected primary color data points, or if not identical, transforming each said corrected primary color data point from said first color space construct into a corrected primary color data point in said second color space construct to create a table of second color space corrected primary color data points and continuing said method by selecting and using said table of second color space corrected primary color data points;

for each threshold value of said dither matrix and each corrected primary color data point of the selected table, determining each output signal needed for each said primary color in said selected table, and storing each said output signal needed as a separate matrix of cells, having the same structure as said dither matrix, of output signal for each primary color in said selected table such that each cell of all matrices is indexed to a corresponding single primary color data point of said predetermined set of primary color data points for each pixel of said image from said first apparatus; and printing said image pixel-by-pixel by selecting the separate matrix of cells indicated for the first pixel single primary color data point of said predetermined set of primary color data points, determining which cell of said dither matrix corresponds to said first pixel single primary color data point of said predetermined set of primary color data points, selecting the cell of the separate matrix of cells indicated for the first pixel single primary color data point of said predetermined set of primary color data points based upon said determined cell of said dither matrix, sending the data point of the selected cell of the separate matrix of cells indicated for the first pixel single primary color data point of said predetermined set of primary color data points as an output signal, and printing a color of said selected table corresponding to said selected cell of the separate matrix of cells indicated for the first pixel single primary color data point of said predetermined set of primary color data points based upon said output signal.

5. The method as set forth in claim 4, further comprising:

repeating said steps for printing said image for each primary color data point.

6. A method for printing a color image, generated on an origin device and represented by data triplet values for each pixel of said color image, with a printer device using a printer device color space data construct, comprising the steps of:

receiving a set of origin device color space data triplet values representative of each of the colors in said color image;

correcting each of said origin device color space data triplet values for printing with said printer;

forming a set of corrected origin device color space data triplet values;

creating a set of printer device color space data triplet values correlated to said origin device color space data triplet values;

creating a set of printer device halftone color space data triplet values for each of said origin device color space data triplet values adapted as output signals for printing said color image;

storing each set of said printer device halftone color space data triplet values as a separate dither matrix of cells of output signals for printing said color image such that a set of said printer device halftone color space data triplet values matrix is correlated to each said origin device color space data triplet value; and printing said color image pixel by pixel by receiving the origin device color space data triplet value for a pixel, selecting the set of said printer device halftone color space data triplet values correlated to said origin device color space data triplet value, selecting the cell of said selected set of said printer device halftone color space data triplet values correlated to said origin device color space data triplet value, and using the output signal stored in said cell to print said color.

7. The method as set forth in claim 6, wherein said step of said printer device halftone color space data triplet values is correlated to said origin device color space data triplet values further comprises the step of:

data point values for cyan, magenta, and yellow primary colors are used for a color printing device.

* * * * *